Jan. 24, 1967 D. J. WAYFIELD Re. 26,148

SWIMMING INSTRUCTION DEVICE

Original Filed June 23, 1958 2 Sheets-Sheet 1

INVENTOR.
DAVID J. WAYFIELD

SWIMMING INSTRUCTION DEVICE

Original Filed June 23, 1958 2 Sheets-Sheet 2

INVENTOR
DAVID J. WAYFIELD

United States Patent Office

Re. 26,148
Reissued Jan. 24, 1967

26,148
SWIMMING INSTRUCTION DEVICE

David J. Wayfield, 225 Liberty Ave., West Islip, Long Island, N.Y. 11795

Original No. 3,140,551, dated July 14, 1964, Ser. No. 743,796, June 23, 1958. Application for reissue Aug. 3, 1964, Ser. No. 399,116
11 Claims. (Cl. 35—29)

Matter enclosed in heavy brackets [ ] appears in the original patent but forms no part of this reissue specification; matter printed in italics indicates the additions made by reissue.

This invention relates to devices for use in giving swimming instruction and more particularly to such devices which provide controlled breathing for the swimming student and provide a series of indications near the head for appropriate coordination in the execution of swimming movements.

Many devices exist in the prior art directed to the problem of teaching swimming. Most of them are rather cumbersome mechanical contrivances which are used out of the water and consequently deprive the learner of experience with actual swimming conditions during the exact period of time when it is most important that such familiarity should be developing. Furthermore, most of the prior art apparatus require the strapping of the student's limbs to various moving elements of the apparatus which provides a somewhat artificial character to the instruction and forces, rather than guides the limbs through the proper movements.

The present invention has been carefully contrived to avoid the disadvantages of the prior art devices and to cope with the many different problems which confront various people when they are learning to swim. The device enables the swimming instructor to take the student through the various stages of instruction and enables the student to learn the various movements of the body and help to coordinate them.

The present invention permits the teaching of swimming in the proper medium, i.e. water. In addition, the device permits the pupils to make mistakes. Thus the pupil's limbs are not forced through predetermined paths but he is given signals which enable him to properly execute and coordinate his limb movements.

It is an object of the present invention to provide a device for teaching swimming in the water and providing the student with signals indicative of proper limb coordination.

Another object is to provide breathing means for giving swimming instruction which provides unobstructive use of the body and limbs in executing swimming strokes.

Another object is to provide such a device which is adapted for simultaneous use with a plurality of similar devices for class instruction.

A further object is to provide a device of the class described permitting the user random and untethered movement, even within a crowded swimming pool.

The present invention comprises an aquatic device for giving swimming instruction comprising a water-tight breathing chamber adapted to receive the nose and mouth of a swimming student and being dimensioned to provide unobstructed use of the body and limbs in exceeding swimming movements.

In one of its embodiments, the invention is comprised of the aforementioned chamber and includes an air hose or conduit formed in an arc of about 270 degrees, one end of said hose rotatably connected to said chamber to a floating ball valve which is normally open in a downward position but closed when downwardly immersed in water. Elastic means are provided for attaching the chamber to the swimmer but the aforementioned hose may serve this additional function by being molded to form a diameter that would be normally less than the distance from the swimmer's mouth to the back of his head. Thus it will be evident that the swimmer will be able to inhale only when turning his head to one side as in the crawl stroke while eliminating the possibility of swallowing or inhaling water.

Attached to the hose opposite one ear is a clock-operated mechanism which emits sounds corresponding to the tempo of the desired swimming movement. One version of the above mechanism, and differently powered, is cited in one of my previous patent applications Serial No. 729,022, FIG. 17, driving member 161, etc.

A plunger (not shown) can be inserted fully to disengage the hollow plastic ball, enabling the swimmer to perform the backstroke without splashing water in his mouth or nostrils.

It is also proposed to eliminate the need for the plunger by connecting said hose with said valve by using a length of standard metal-link tubing permitting the valve to be fixedly reversed to a position of about 180 degrees to end of said hose. It is also understood that said hose could be made entirely of this metal-link tubing.

Still another alternative is to have the hose formed to extend from the region of the mouth to a position above one ear forming an arc of about 100 degrees and then curving oppositely in a direction of about 200 degrees and thus accomplishing the same primary purpose without said hose encircling the head.

Also optional would be the use of a standard flutter valve for exhalation as shown in 5b.

Other objects and features of the invention will be come apparent in the following description and claims and in the drawings in which:

Figure 1:
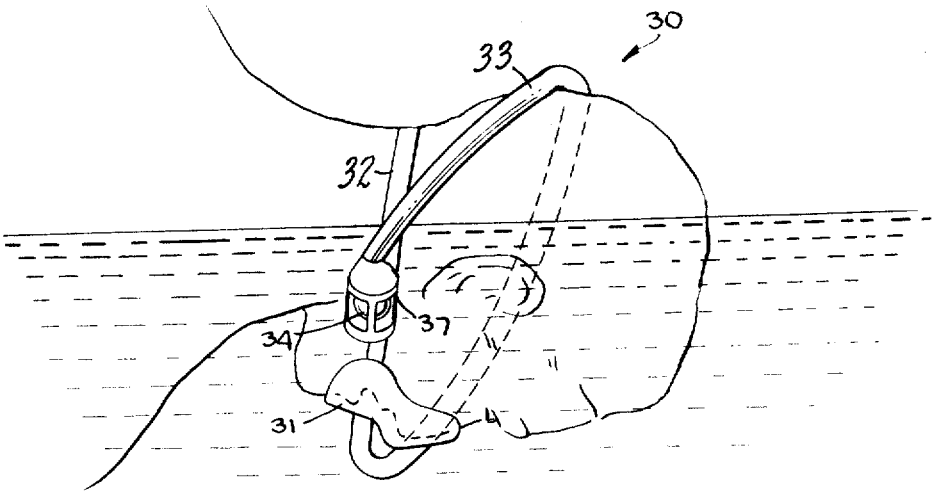
FIG. 1 is a perspective view of one embodiment showing its general arrangement during use.
Figure 2B:
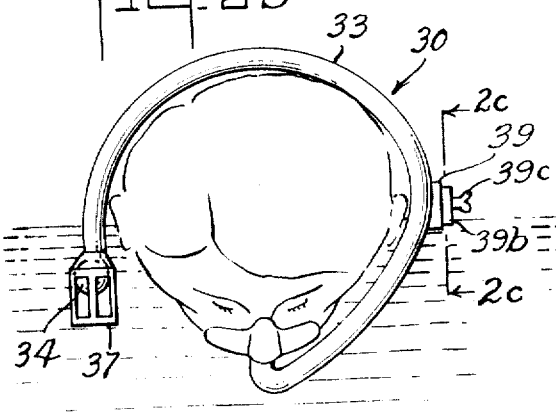
FIG. 2b is a front view of FIG. 1 during one phase of its use.
Figure 3:
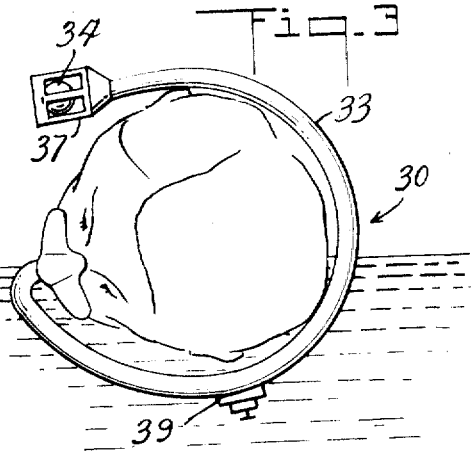
FIG. 3 is a front view of FIG. 1 during another phase of its use.
Figure 4:
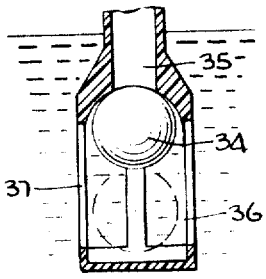
FIG. 4 is an enlarged schematic of the valve member in a closed position, with broken lines indicating the open position.

Referring now to the drawings, FIG. 1 shows an aquatic device according to the present invention and is designated generally by the reference numeral 30. It consists of a pliable breathing chamber or mask 31 adapted to receive the mouth and nose of the student and an elastic band 32 attached to the chamber and encircling the head as shown. An air conduit or hose 33 internally connected with breathing chamber or mask 31 is formed to encircle the head and has at its extremity a standard hollow-ball valve 37. FIG. 4 shows this valve which consists of a hollow floating ball 34 in an upward position closing aperture 35 and in a downward open position as shown by the broken lines 36.

Figure 2C:
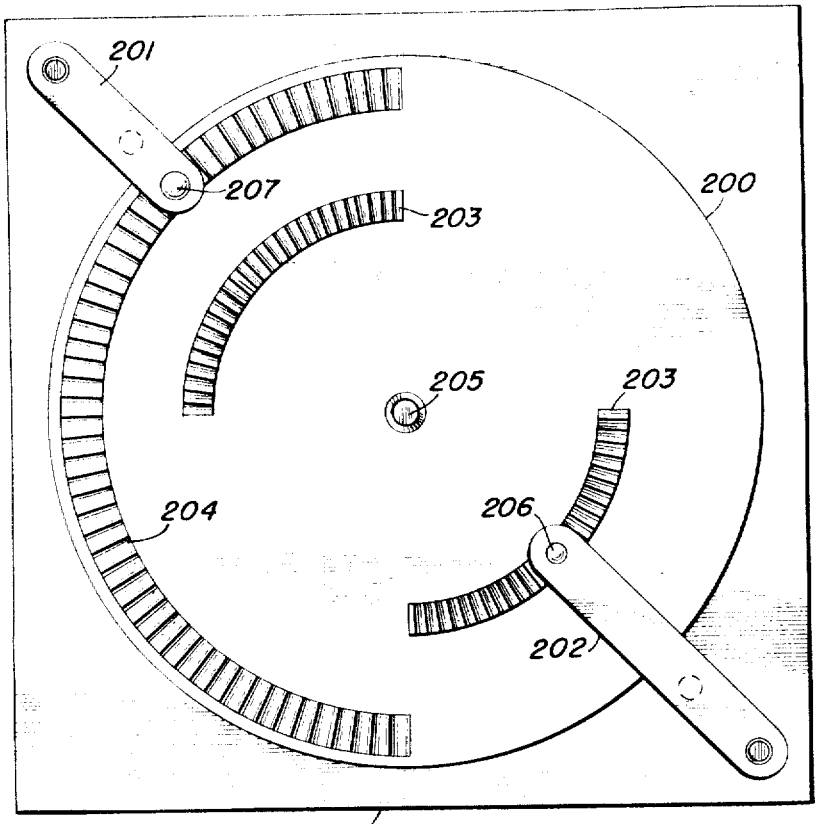
FIG. 2c is an enlarged section taken along the lines 2c—2c of FIG. 2b.

Molded into or attached to the hose 33 is a recess or receptacle 39 for holding clock face or disc 200 which is rotated by spring-wound clock element 39b which is hand-operated by key 39c. Disc 200 is shown in detail in FIG. 2c and is rotated by rod 205. The corrugations 203 on said disc, strike protrusion 206 of stationary arm 202, emitting sound which may serve to indicate the desired movement of one leg of the swimmer. Corrugations 204, strike protrusion 207 of stationary arm 201, emitting sound which may serve to indicate the moment at which one arm should begin and terminate a stroke. Naturally the corrugations 204 differ considerably from those of 203 in depth and spacing so as to produce distinctly different sounds. Protrusions 206 and 207 also differ in size for the same reason.

Figure 5:
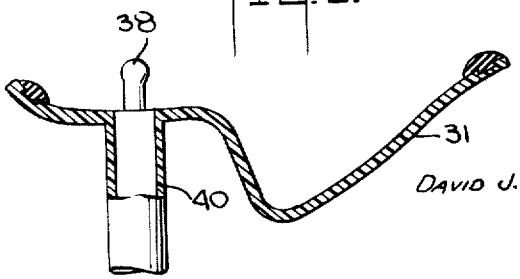
FIG. 5 is an enlarged sectional view of the face attachment as shown in FIG. 1.
Figure 5B:
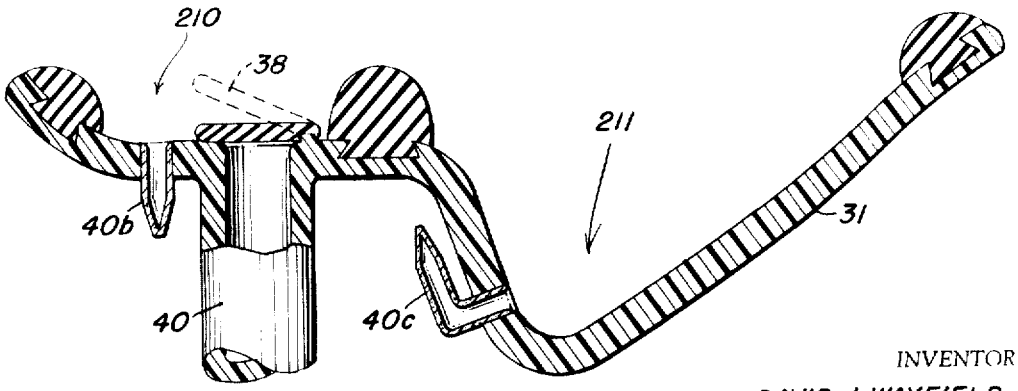
FIGURE 5b shows a sectional view of a face attachment similar to that shown in FIGURE 5.

FIG. 5b (substituted for FIG. 5) shows an enlarged schematic of the mask 31 with a compartment 210 for the mouth and a separate compartment 211 for the nose, each having its respective exhaust valves, 40b and 40c. Intake check valve 38 is shown in the closed position caused by the exhalation of the swimmer and the dotted line shows the open position, caused by the inhalation of the swimmer. The intake opening 40 is shown without the various valves which may be attached thereto—if not incorporated within the mask.

The device 30 is shown to accommodate the swimmer learning to breathe on his right side but the hose 33 can be rotated 180 degrees at the extremity which is frictionally and internally joined to the tubular protrusion 40 of mask 31 in order to accommodate the swimmer learning to breathe on his left side.

The above mentioned chamber is internally divided into two separate chambers, one for the mouth and one for the nose. Each has its own exhalation flutter valve but only the mouth is provided with inhalation means. The reason for this is that in swimming the Crawl, one inhales through the mouth and exhales through both the mouth and the nose.

From the above it can be seen that a new and novel device is provided for giving swimming instruction, either on an individual basis or in classes whereby ryhthmic coordination of the limbs and proper swimming strokes and leg movements can be learned with a minimum of supervision. Furthermore such instruction is now made possible under actual normal swimming conditions to accelerate the development of confidence in the swimming student. The device does not force the swimmer's motions, but permits him to gradually yet rapidly develop the proper movements. The device can be constructed of inexpensive materials, is light, portable and easily stored in a minimum of space. No complicated machinery is invalved nor, because of its simplicity of structure, is maintenance a problem.

While certain embodiments of the invention have been shown and described, it is to be understood that variations and additions can be made by those skilled in the art without departing from the scope and spirit of this invention.

I claim:

1. A swimming mask adapted to cover at least the wearer's nose and mouth comprising an inhalation tube and means connected to said tube to close same upon the horizontal submersion of the swimmer's face, said mask further characterized by a self-contained, clock-operated mechanism for emitting signals in a predetermined tempo.

2. An aquatic device for teaching the American Crawl swimming stroke, comprising a mask adapted to fit tightly around the face of the swimmer and rotatable, inhalation valve means capable of being positioned on the right or left side of the swimmer's head.

3. A swimming instruction device as defined in claim 2 further characterized by means for indicating desired swimming movements.

4. A swimming instruction device as defined in claim 2 further characterized in that the valve is of the float ball type.

5. An aquatic device as defined in claim 2, further characterized in that the mask and valve means are connected by a tube of the type permitting conversion of the device to a snorkel.

6. An aquatic device as defined in claim 2, further characterized in that the mask and valve means are connected by a metal-link-type tube, permitting conversion of the device to a snorkel.

7. All aquatic device to teach swimming, comprising a mask to cover at least the nose and mouth, said mask having valve means designed to prevent the inhalation of air when the face is horizontally submerged, said valve means also designed to permit the inhalation of air when the downwardly submerged face is rotated about 90 degrees upwardly in a predetermined direction, said mask containing means for producing repeating signals in a desired tempo.

[8. An aquatic device for receiving swimming instruction comprising a breathing mask adapted to receive the mouth and nose of the swimmer, air conduit means attached thereto, valve means being provided therein and automatically closing said air conduits when swimmer's face is in a normal downward, Crawl, swimming position and automatically opening said air conduit when swimmer's face is turned upwardly to one side in an arc of approximately 90 degrees in a normal upward Crawl swimming position and clock means attached thereto which emit audible signals in timed relation to indicate to the student appropriate coordination of the parts of the body in executing swimming strokes.]

*9. A swimming device for teaching proper breathing, comprising a mask adapted to cover the wearer's nose and mouth, said mask having separate chambers for receiving the mouth and nose, said chambers having separate exhalation valve means, said mask having inhalation means permitting air but not water to enter the chamber receiving the mouth.*

*10. A swimming mask designed to prevent the inhalation of water, comprising a pliable breathing chamber enclosing the mouth and a chamber separately enclosing the nose, said mask secured to the swimmer's face by an integral air conduit encircling at least part of the swimmer's head, said conduit having valve means at its extremity which closes when the swimmer's face is horizontally submerged and opens when the face is turned slightly to one side, said mask having valve means for limiting the rebreathing of exhaled air.*

*11. A swimming mask for teaching swimming strokes and proper breathing comprising a pliable breathing chamber designed to fit securely about the face of a student swimmer, inhalation and exhalation means integral with said chamber, and a self-contained powered rotating disc providing indicia for arm and leg movements during the normal swimming breathing cycle.*

*12. An aquatic device for receiving swimming instruction comprising a breathing mask adapted to receive the nose and mouth of the swimmer, air conduit means attached thereto, valve means being provided therein and automatically closing said air conduit when the swimmer's face is in a normal downward, Crawl swimming position, and automatically opening said air conduit when the swimmer's face is turned upwardly to one side in an arc of approximately 90 degrees in a normal Crawl swimming position.*

References Cited by the Examiner

The following references, cited by the Examiner, are of record in the patented file of this patent or the original patent.

(Other references on following page)

UNITED STATES PATENTS

| | | | |
|---|---|---|---|
| 510,481 | 12/1893 | Linzeler et al. | 61—70 X |
| 938,247 | 10/1909 | Kuhn | 128—146 X |
| 1,445,010 | 2/1923 | Feinberg. | |
| 1,946,126 | 2/1934 | Black | 128—145.1 |
| 2,317,237 | 4/1943 | Wilen. | |
| 2,388,674 | 11/1945 | Browne. | |
| 2,535,809 | 12/1950 | Niendorff | 58—130 X |
| 2,742,899 | 4/1956 | Warner. | |
| 2,859,747 | 11/1958 | Stampe | 128—146 |
| 2,942,072 | 6/1960 | Cunningham. | |
| 3,051,170 | 8/1962 | Benzel | 128—145.1 X |

FOREIGN PATENTS

| | | |
|---|---|---|
| 736,745 | 9/1932 | France. |
| 883,278 | 3/1943 | France. |
| 1,100,250 | 3/1955 | France. |
| 415,452 | 10/1946 | Italy. |

EUGENE R. CAPOZIO, *Primary Examiner.*

JEROME SCHNALL, *Examiner.*

H. S. SKOGQUIST, *Assistant Examiner.*